United States Patent [19]

Salzburger et al.

[11] Patent Number: 5,607,544
[45] Date of Patent: Mar. 4, 1997

[54] PROCESS AND AGENT FOR THE OXIDATIVE BLEACHING OF WOOD PULP AND FOR DEINKING WASTE PAPER

[75] Inventors: Wolfram Salzburger, Bensheim; Silke Eifler, Dudenhofen; Margarete Scholl, Mannheim, all of Germany

[73] Assignee: BK Ladenburg GmbH für Chemische Erzeugnisse, Ladenburg, Germany

[21] Appl. No.: 411,148

[22] Filed: Mar. 27, 1995

[30] Foreign Application Priority Data

Mar. 26, 1994 [DE] Germany ............ 44 10 663.7

[51] Int. Cl.$^6$ .................... D21H 11/00; D21H 21/32
[52] U.S. Cl. .................... 162/5; 162/77; 162/78; 568/335
[58] Field of Search .................... 162/5, 19, 76, 162/77, 78; 210/698, 759, 764; 252/180, 181, 186.28; 568/335, 336, 337

[56] References Cited

U.S. PATENT DOCUMENTS

| Re. 26,009 | 5/1966 | Buckman et al. | 568/337 |
| 3,790,687 | 2/1974 | Bertin et al. | 210/764 |

FOREIGN PATENT DOCUMENTS 2269191  2/1994  United Kingdom ............ 162/78

OTHER PUBLICATIONS

Published Article "Hydrogen peroxide bleaching in waste paper re-cycling, J. de Ceuster et al," Paper Technology and Industry, Apr. 1977, pp. 126–132.

*Primary Examiner*—Joseph W. Drodge
*Attorney, Agent, or Firm*—Foley & Lardner

[57] ABSTRACT

The present invention provides a process for the oxidative bleaching of wood pulps and for deinking waste paper by means of hydrogen peroxide and a stabilizing agent, wherein, as stabilizing agent, there is used 2-oxo-2-(4-hydroxyphenyl)-acethydroximic acid chloride (N,4-dihydroxy-α-oxophenylethanimidoyl chloride) of the formula:

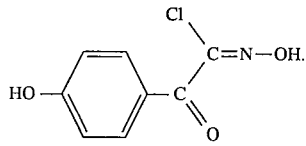

13 Claims, No Drawings

PROCESS AND AGENT FOR THE OXIDATIVE BLEACHING OF WOOD PULP AND FOR DEINKING WASTE PAPER

BACKGROUND OF THE INVENTION

1. Field of the Invention

The present invention is concerned with a process for the oxidative bleaching of wood pulp and for deinking waste paper with the help of hydrogen peroxide in the presence of a stabilising agent.

2. Description of Related Art

For the production of paper, besides the use of native wood pulps, to an increasing extent resource is had to recycled waste paper. The reuse of waste paper as a raw material source for the production of papers with a high degree of whiteness or brightness can only take place when, on the one hand (i), the coloured materials contained in the waste paper are substantially removed by rinsing out (in the following called deinking) and, on the other hand, (ii) the residues of coloured material are subjected to a chemical bleaching. Both procedures (i) and (ii) can be carried out in a common or in a multi-step process. The bleaching chemicals are used in order to destroy the chromophores present in the fibre materials, i.e. the coloured materials originating from the waste paper, as well as the dissolved and undissolved components of the printing colours. The bleaching can be carried out with oxidising and/or reducing chemicals. Many processes for deinking and bleaching are described in the literature. A preferred process is the simultaneous deinking and bleaching with hydrogen peroxide for waste paper and wood pulp.

The combined process is carried out, for example, with an agent of the following base composition:

| | |
|---|---|
| sodium hydroxide | 1.0–1.5% referred to atro material |
| hydrogen peroxide | 0.5–1.5% referred to atro material |
| sodium silicate | up to 4.0% referred to atro material |
| complexing agent | 0.1–0.4% referred to atro material |
| soap | 0.6–1.0% referred to atro material |
| waste paper/ wood pulp | 0.9–2.0% referred to atro material. |

By "atro material" is to be understood the amount of the air-dried mixture of waste paper and wood pulp. The statements of percentage are percentages by weight.

In practice, as carrier medium there is essentially reused in a cyclic process the water originating from the process. The deinking process water has, in general, a temperature of 30° to 60° C. In the first step of removing the coloured material, the pH reaches a value of 9.5–10.5.

The separation of fibres and printing colours is promoted by the alkaline medium. Hydrogen peroxide has proved to be an ideal bleaching agent since it bleaches especially effectively in an alkaline medium by activation of the hydroperoxide anion (see equation 1). $HO_2^-$ is the important molecule for the bleaching action.

Equation 1:

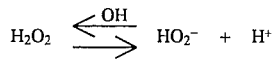

During the process, as side reactions according to the following equation 2, there occurs a spontaneous dissociation of the hydrogen peroxide in the case of the presence of heavy metal ions or in the case of the presence of the enzyme catalase, as well as decomposition of the peroxide catalysed by peroxidases. They reduce the degree of utilisation of the amount of hydrogen peroxide used and thereby influence the bleaching action. The result is an increased requirement of hydrogen peroxide and aqueous sodium hydroxide solution.

Equation 2:

$$2H_2O_2 \rightarrow 2H_2O + O_2$$

It is known to mask the damaging action of heavy metal ions by the addition of complex formers, such as ethylenediamine-tetraacetic acid, penteric acid (DTPA), polycarboxylic acids, for example citric acid, gluconic acid, polyacrylic acid, phosphonic acids and the like. These also serve simultaneously as flotation agents in the case of deinking (cf. DE 42 04 915 Al).

As natural products, waste paper and wood pulp are nutrient media for microbiological growth. Almost all micro-organisms which occur as a natural contamination on and in waste paper and wood pulp synthesise, as cell-inherent enzymes, catalases and various peroxidases.

Micro-organisms are introduced into the deinking system by the introduction of the raw materials (waste paper and wood pulp) and by the process water. The addition of hydrogen peroxide and of other chemicals, the extreme change of the pH value and the varying temperatures during the process act as stress factors on the bacteria which can lead to lysis of the bacteria. Within the process water circulation, an equilibrium is adjusted between the rate of reproduction of the micro-organisms in the system, including the bacteria introduced by the introduced material and the lysing bacteria in the system. By means of the lysis of the bacteria, the enzyme-containing cell substance, which contains catalases and peroxidases, are given off into the deinking process water.

The influence of the enzyme catalase on the bleaching activity of hydrogen peroxide in the bleaching of waste paper and wood pulp is described in the literature. Thus, G. Galland and Y. Vernac, Progr. Pap. Recycling, Vol. 2, pp. 20–30/1992, in their treatise concerning "Bleaching of recycled pulp", refer to various causes for the decomposition of peroxide during the bleaching process.

Besides traces of heavy metals, such as iron, manganese, copper and aluminium, the enzyme catalase is mentioned as the main cause of the decomposition of peroxide. Already in the case of catalase concentrations of 45 mg/liter, 60% of the hydrogen peroxide is decomposed within 10 minutes under the usual deinking bleaching conditions. The participation of catalase in the total rate of decomposition can be determined by destroying the catalase by boiling and determining the rate of decomposition of the hydrogen peroxide before and after the boiling. The difference gives the proportion of catalase.

The following methods are discussed in order to eliminate the catalase:

1. The system is to be kept free of biological activity.
2. The catalase is to be destroyed before the bleaching with:
   heat treatment greater than 70° C. sodium hypochlorite, concentration 0.3%
3. acid wash (see V. Gehr et al., Das Papier, pp. 186–195/1993).

These methods are not satisfactory. To keep an open technical system free from contaminations is practically impossible since, especially with waste paper, micro-organisms are continuously introduced into the system. A heat treatment costs energy and is time-consuming and, in addition, damages the paper fibres. The addition of hypochlorite is admittedly comparatively economic but also leads to a damaging of the fibres and to additional loading of the waste paper. The acid wash requires a separate process step and a subsequent expensive neutralisation, water-loading salts thereby again being formed.

SUMMARY OF THE INVENTION

Therefore, it is an object of the present invention to reduce the damaging influence of the hydrogen peroxide-decomposing catalases and peroxidases and thereby to avoid the above-mentioned disadvantages.

Thus, according to the present invention, there is provided a process for the oxidative bleaching of wood pulp and for the deinking of waste paper by means of hydrogen peroxide and a stabilising agent, wherein, as stabilising agent, there is used 2-oxo-2-(4-hydroxy-phenyl)-acethydroximic acid chloride (N,4-dihydroxy-α-oxophenylethanimidoyl chloride) of the formula:

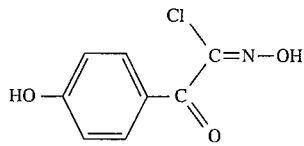

The stabilising agent can be used in a concentration of 0.002–2 g/kg of process water and preferably of 0.001–0.2 g/kg.

The stabilising agent can be added to the recycled process water.

The present invention also provides an agent for stabilising hydrogen peroxide-containing bleaching and deinking solutions for waste paper, wherein it contains 2-oxo-2-(4-hydroxyphenyl)-acethydroximic acid chloride (N,4-dihydroxy-α-oxophenylethanimidoyl chloride) as stabilising agent.

DETAILED DESCRIPTION OF THE PREFERRED EMBODIMENTS

After the exclusion of the activity of the enzymes, by means of the use of 2-oxo-2-(4-hydroxyphenyl)-acethydroximic acid chloride (hereinafter called paraclox) or of mixtures containing this substance, the residual content of the hydrogen peroxide in the process is increased after the bleaching procedure. This can lead to a saving of considerable amounts of hydrogen peroxide while the bleaching action remains the same (whiteness, brightness) or to an increase of the degree of whiteness in the case of reduced amounts of peroxide.

The use of the stabiliser according to the present invention takes place in the bleaching deinking process, for example in the enzyme-containing inflow of the pulp water or in the pulper itself. In the case of all further bleaching processes for waste paper (after-bleaching) or wood pulp, the above-mentioned agent is added to the fibre diluting water or to the bleaching chemicals directly before the addition of the materials to be bleached.

Paraclox has previously been used in the paper industry in order to reduce the growth of slime-forming bacteria in the water circulations and in the waste water and thereby to prevent a blockage of the pipes. It is surprising that this substance is suitable for the inactivation of free catalase and/or of peroxidase itself and not only to prevent the post-formation due to the growth of the micro-organisms.

The effectiveness of the agent used according to the present invention is shown by the following Examples.

EXAMPLE 1

Measurement of the Hydrogen Peroxide-stabilising Action of Various Antibacterially-acting Molecules on the Process Water (deinking) of a Paper Factory The catalase test depends upon the measurement of the increase of the pressure in an airtight-closed vessel after the introduction of 0.1% hydrogen peroxide. With increasing concentration of catalase in a sample, the pressure to be measured increases correspondingly. The pressure is given as an electric signal in relative units (mV). The pressure increase is measured after 10 minutes.

| active substance/concentration | pressure in in relative units (mV) |
|---|---|
| 400 ppm 2-oxo-2-(4-hydroxyphenyl)-acethydroximic acid chloride | 0.2 |
| 100 ppm 2-oxo-2-(4-hydroxyphenyl)-acethydroximic acid chloride | 0.5 |
| 10 ppm 2-oxo-2-(4-hydroxyphenyl) acethydroximic acid chloride | 4.2 |
| 400 ppm 2,2-dibromo-3-nitrilo-propionamide (DBNPA) | >9.0 |
| 400 ppm tetrakishydroxymethyl-phosphonium sulphate (THPS) | >9.0 |
| 400 ppm sodium monomethyldithio-carbamate (metamsodium) | 5.0 |
| 400 ppm monomethylammonium mono-methyl dithiocarbamate (MDTCMA) | >9.0 |
| 400 ppm methylene bisthiocyanate (MBT) | 6.2 |
| comparison sample without additive | 9.8 |

(ppm = parts per million or g of substance/100 kg water)

EXAMPLE 2

Determination of the Residual Peroxide Content After the Addition of Paraclox to Different Process Water Samples (deinking)

The measurement of the residual peroxide content took place by iodometric titration.

The initial peroxide content corresponds to 100% (=0.1% hydrogen peroxide (100%)).

|  | 0 min. | 30 min. | 60 min. | 90 min. | 120 min. |
|---|---|---|---|---|---|
| Process water 1 (clear filtrate) | | | | | |
| 0 sample | 100% | 1.8% | 0% | 0% | 0% |
| 10 ppm paraclox | 100% | 55.4% | 43.1% | 33.8% | 26.9% |
| 100 ppm paraclox | 100% | 95.4% | 87.7% | 87.7% | 86.1% |
| Process water 2 (drum 1) | | | | | |
| 0 sample | 100% | 0% | 0% | 0% | 0% |
| 2 ppm paraclox | 100% | 3.6% | 0% | 0% | 0% |
| 20 ppm paraclox | 100% | 62.1% | 56.8% | 50.8% | 47% |

EXAMPLE 3

Determination of the Effect of Paraclox on the Degree of Whiteness, the Florate, the Ash and the Residual Peroxide Content Experimental Arrangement of the Deinking Experiment in the Laboratory Into 1 liter of water of 30° dH (tap water) are introduced:

| | |
|---|---|
| stabiliser | 0.2% |
| waterglass | 2.0% |
| aqueous sodium hydroxide solution | 1.0% |
| soap | 1.0% |
| peroxide | 1.5% | and heated to 60° C.

Into the pulper (2800 r.p.m.) are introduced 50 g of atro waste paper and the chemical solution is subsequently introduced. The pulping time is 10 minutes. After ending of the brushing out time, the paper slurry is shaken out into a glass beaker, stirred up with a commercially available ultrasonic disperser and the pH value determined.

The pH value is 9.5±0.2. 100 ml are taken from the brushed out suspension and a sheet formed (degree of whiteness and brightness before the flotation).

The remaining fibre material is placed for 110 minutes in a waterbath with a temperature of 50° C. After the residence time, it is dispersed with a disperser for 1 minute at 10,000 r.p.m. The paper slurry is emptied into a flotation cell which is filled with water with a temperature of 50° C. There is thereby adjusted a material density of 0.8% (pH value 8.5). Air is introduced into the cell at a rate of 60 liters/hour and the speed of stirring is 1000 r.p.m. The flotation time is 10 minutes, foam being skimmed off manually. After the flotation is ended, acidification is carried out with sulphuric acid to pH 5 and sheets are formed.

The brightness and degree of whiteness are measured on the front and rear side and the average value determined.

Statement of the Degree of Whiteness:
R 457: reflection factor at 457 nm wavelength
Y/C: standard type of light C/1931

Process water 1 was used. The statements of percentage refer to the commercial product and the residual peroxide was determined by a titration method.

| | before flotation | | after flotation | | flotate | ash | residual peroxide |
|---|---|---|---|---|---|---|---|
| | R457 | Y/C | R457 | Y/C | % | % | % |
| 0 sample | 50.1 | 54.1 | 60.7 | 66.8 | 22.6 | 47.8 | 15.7 |
| paraclox 0.08% | 50.6 | 53.5 | 60.7 | 66.8 | 24.4 | 43.9 | 49.7 |

In the case of values otherwise remaining the same, the residual peroxide content shows a concentration dependency in the experimental batch.

| | |
|---|---|
| 0 sample | 15.7% residual peroxide |
| paraclox 0.02% | 21.4% residual peroxide |
| paraclox 0.04% | 28.5% residual peroxide |
| paraclox 0.08% | 49.7% residual peroxide |

EXAMPLE 4

Determination of the Influence of DTPA-containing Stabiliser (heavy metal complexing) on the Rate of Decomposition of Peroxide in Comparison With the Action of Catalase-inhibiting Substances As sample, there was used process water 3 and worked up analogously to Example 1. After the addition of 0.1% hydrogen peroxide (referred to 100% hydrogen peroxide), there was measured the pressure increase in relative pressure units (in mV) after 10 minutes. The measurement took place at ambient temperature.

| | |
|---|---|
| 0 sample | 9.8 |
| paraclox 400 ppm | 0.2 (referred to process water volume) |
| DTPS stabiliser 2000 ppm | 5.9 (referred to process water volume) |

EXAMPLE 5

Investigation of the Action of Paraclox, Glutaraldehyde and Chlorine Bleach Lye on the Pure Enzyme Catalase Method According to Biurett Chemicals:

phosphate buffer 0.05M, pH 7.0 ($K_2HPO_4$: 8.7 g/l; $KH_2PO_4$: 6.8 g/l)

enzyme catalase (No. C10 Sigma catalogue)

substrate hydrogen peroxide (30%).

1. Enzyme solution (solution A):

Dissolve catalase in 0.05M phosphate buffer.

Concentration: 50 sigma units per ml of buffer.

1000 ml solution A contains 50,000 sigma units 1600 units=1 mg solid material (C10 catalase)

50,000 units=31.25 mg of solid material (C10 catalase)

The enzyme solution must be used directly.

2. Substrate solution (=solution B)

Dissolve 0.1 ml 30% hydrogen peroxide in 50 ml of 0.05M phosphate buffer (control) or in 50 ml phosphate buffer which contains the stabiliser (substrate). Measure the absorption at 240 nm. The result must lie between 0.550 and 0.520. Possibly dilute the solution or add more hydrogen peroxide thereto.

3. Measurement 2.9 ml of solution B are placed in a quartz cuvette and subsequently mixed with 0.1 ml of solution A. The absorption at 240 nm should, at the beginning of the measurement, amount to approximately 0.450. The time needed for the decrease of the absorption at 240 nm from 0.450 to 0.400 is determined. This time corresponds to the conversion of 3.45 μmol hydrogen peroxide in 3 ml of sample volume.

Result:

Activity (sigma units total)=3.45: time (minutes calculating back to active sigma units 1 sigma unit reacts 1.0 μmol hydrogen peroxide per minute (at pH 7.0; 25° C.).

| paraclox | | glutaraldehyde | |
|---|---|---|---|
| 0 sample | 0% inhibition | 0 sample | 0% inhibition |
| paraclox 0.2 ppm | 0% inhibition | glutar- aldehyde 0.5 ppm | 6% inhibition |
| paraclox 1 ppm | 16% inhibition | glutar- aldehyde 2.5 ppm | 9% inhibition |
| paraclox 2 ppm | 63% inhibition | glutar- aldehyde 5 ppm | 11% inhibition |

Sodium hypochlorite reacts in solution B with hydrogen peroxide with decomposition before catalase can be added.

EXAMPLE 6

Catalase-dependent Action of Paraclox on the Stability of the Hydrogen Peroxide in a Flotation Experiment In the case of this experiment, working was analogous to Example 3 but tap water was used instead of process water. The influence of catalase (due to the substantial absence of bacteria) is thereby distinctly reduced. At the same time, in the case of this experiment, the addition of waterglass as stabiliser is omitted.

| | whiteness after flotation | | | | residual |
|---|---|---|---|---|---|
| | R457 | Y/C | flotate | ash | peroxide |
| 0 sample | 54.6 | 58.2 | 16.7% | 46.5% | 15% |
| paraclox 0.02% | 55.4 | 59.8 | 20.7% | 50.2% | 34.0% |
| paraclox 0.04% | 55.8 | 60.5 | 18.7% | 51.0% | 41.0% |
| paraclox 0.08% | 55.0 | 58.8 | 23.3% | 48.4% | 52.4% |

The results show for paraclox a very good stabilising action on the peroxide. This action is not to be attributed exclusively to the inhibition of the catalase and depends upon a side effect which has hitherto not been elucidated.

We claim:

1. A process for the oxidative bleaching of wood pulp comprising contacting said wood pulp with an aqueous composition comprising hydrogen peroxide and a stabilising agent, said stabilising agent being 2-oxo-2-(4-hydroxyphenyl)-acethydroximic acid chloride (N,4-dihydroxy-oxyphenylethanimidoyl chloride) of the formula

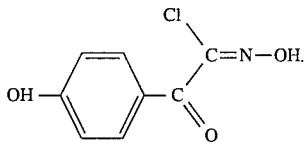

2. The process according to claim 1, wherein the stabilising agent is present in a concentration of 0.002 to 2 g/kg of said composition.

3. The process according to claim 2, wherein the stabilising agent is present in a concentration of 0.01 to 0.2 g/kg of said composition.

4. The process according to claim 1, wherein said composition is recycled and the stabilising agent is added thereto.

5. Wood pulp, prepared by contacting said wood pulp with a composition comprising hydrogen peroxide and the stabilising agent of claim 1.

6. A process for stabilizing a hydrogen peroxide-containing bleaching solution or a hydrogen peroxide-containing deinking solution comprising contacting said bleaching solution or said deinking solution with a stabilising effective amount of 2-oxo-2-(4-hydroxyphenyl)-acethydroximic acid chloride (N,4-dihydroxy-oxyphenylethanimidoyl chloride) of the formula

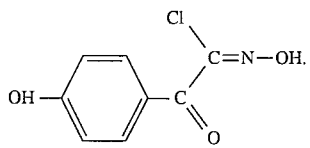

7. The process as claimed in claim 6, wherein said stabilising agent is present in a concentration of 0.002 to 2 g/kg of said bleaching solution or said deinking solution.

8. The process according to claim 7, wherein said stabilising agent is present in a concentration of 0.01 to 0.2 g/kg of said bleaching solution or said deinking solution.

9. A process for deinking waste paper comprising contacting said waste paper with an aqueous composition comprising hydrogen peroxide and a stabilising agent, said stabilising agent being 2-oxo-2-(4-hydroxyphenyl)-acethydroximic acid chloride (N,4-dihydroxyoxyphenylethanimidoyl chloride) of the formula

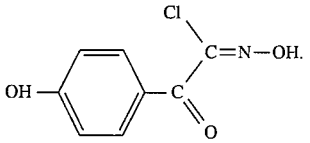

10. The process according to claim 9, wherein the stabilising agent is present in a concentration of 0.002 to 2 g/kg of said composition.

11. The process according to claim 10, wherein the stabilising agent is present in a concentration of 0.1 to 0.2 g/kg of said composition.

12. The process according to claim 9, wherein said composition is recycled and the stabilising agent is added thereto.

13. Waste paper prepared by contacting said waste paper with a composition comprising hydrogen peroxide and the stabilising agent of claim 9.

* * * * *